United States Patent
Harrison

(10) Patent No.: US 9,290,686 B2
(45) Date of Patent: Mar. 22, 2016

(54) REGENERATIVE COMPOSITIONS FOR THE ENTRAPMENT OF PARTICLES AND METHODS FOR ITS USE

(71) Applicant: James Jefferies Harrison, West Hills, CA (US)

(72) Inventor: James Jefferies Harrison, West Hills, CA (US)

(*) Notice: Subject to any disclaimer, the term of this patent is extended or adjusted under 35 U.S.C. 154(b) by 279 days.

(21) Appl. No.: 13/944,490

(22) Filed: Jul. 17, 2013

(65) Prior Publication Data

US 2015/0020849 A1 Jan. 22, 2015

(51) Int. Cl.
*B08B 3/08* (2006.01)
*C11D 3/37* (2006.01)
*C09K 3/22* (2006.01)
*C08G 77/04* (2006.01)
*C08G 77/20* (2006.01)
*B08B 7/00* (2006.01)

(52) U.S. Cl.
CPC ... *C09K 3/22* (2013.01); *B08B 3/08* (2013.01); *B08B 7/0014* (2013.01); *B08B 7/0028* (2013.01); *C08G 77/04* (2013.01); *C08G 77/20* (2013.01); *Y10T 428/31663* (2015.04)

(58) Field of Classification Search
CPC ...... B08B 7/0014; B08B 7/0028; B08B 3/08; C11D 3/373; C11D 3/3738; C11D 11/0023; C08G 77/04; C08G 77/20; C09K 3/22
USPC .................................. 510/466, 475
See application file for complete search history.

(56) References Cited

U.S. PATENT DOCUMENTS

| 2003/0034050 A1* | 2/2003 | Policicchio ............. A47L 13/20 134/6 |
| 2014/0102475 A1* | 4/2014 | Martinez-Crowley . C11D 1/667 134/6 |

OTHER PUBLICATIONS

Swiffer Sweeper Web Page (http://www.swiffer.com/products/swiffer-sweeper) accessed on Oct. 8, 2013.
Dustbane Sweeping Compound product description Web Page (http://www.officedepot.ca/Floor-and-carpet-Cleaners/Dustbane-Sweeping-Compound-16740042.asp) accessed Oct. 8, 2013.

* cited by examiner

*Primary Examiner* — Saeed T Chaudhry
(74) *Attorney, Agent, or Firm* — Stout, Uxa & Buyan; Carlos A. Fisher

(57) ABSTRACT

Compositions and methods of removing particulate matter from a surface. An example comprises contacting a kneadable dust removal composition with the surface so that the particulate matter adheres or becomes embedded within the composition, and is removed from the surface with the dust removal composition. Preferably the dust removal composition comprises a polymerized siloxane, more preferably a substituted polymerized siloxane, even more preferably, a non-cross-linked, linear polymerized siloxane. In other embodiments the invention comprises a kneadable dust removal composition, preferably comprising a polymerized siloxane. The dust removal composition may be packaged to be attachable to a broom, sweeper, or mop so that it make used to pick up residue from sweeping, brushing or mopping. In other embodiments the dust removal composition may be packaged in a "twist-up" or other similar package permitting the composition to be extruded or advanced to expose a fresh surface.

18 Claims, No Drawings

REGENERATIVE COMPOSITIONS FOR THE ENTRAPMENT OF PARTICLES AND METHODS FOR ITS USE

FIELD OF THE INVENTION

The present invention is directed to methods and compositions for entrapping, adhering, and or removing particulate matter from a surface, such as a floor or counter surface. These compositions may be used alone or in conjunction with a broom, mop, dry mop, or other sweeping apparatus. In certain uses the composition may be used as a household product, or may be used in other applications, such as, without limitation, in carpentry or machine shops, or on construction sites.

When using a broom, such as a full-length or dust broom, particularly in conjunction with a dustpan to remove the collected sweepings, there is usually a small amount of sweepings left over which are not easily gathered into a dustpan. This residue is often left on the surface, where it may be dispersed to render it less visible, swept "under the rug", or one or more attempts may be made to pick it up with a dustpan.

A solution of sorts was proposed by the use of so-called "dry mops", which comprise a handled mop having a material such as cloth, yarn, or polymeric sheets (e.g., comprising a foam or microfiber sheet) to attract and retain dust and dirt. These may also be combined with a dry mop conditioner such as ammonia, an oil, a charged substance able to attract particles having the opposite charge in the dirt or dust, or a substance increasing the static charge of the dry mop. The dry mop may be washed or shaken to clean it of collected particles and dust.

The Proctor and Gamble Company markets a dry mop product called the SWIFFER® sweeper which, in its basic configuration, comprises a handle secured at an end to a flat rectangular pad structured to contact the floor or surface to be cleaned. The lower, surface-contacting surface is padded with a thin sponge layer, and in use is covered with a replacable microfiber cloth. The cloth may be, for example, a thick, dry sweeping cloth to attract hair, dist and dirt, or a wet mopping cloth to dissolve dirt.

However, when using the SWIFFER® sweeper on surfaces such as wood, laminate, linoleum or other non-porous substrates, there is commonly an amount of particulate residue remaining. In recognition of this problem, Proctor and Gamble have the introduced a product called the SWIFFER® SweeperVac, which combines a SWIFFER® dry mop with a vacuum cleaner. The vacuum inlet is arranged and aligned along the distal edge of the pad portion of the dry mop, while the dirt cup and motor portion of the vacuum are structured within the handle. Due to the greatly increased sophistication of the device, the SWIFFER® SweeperVac costs substantially more than the SWIFFER® sweeper alone.

Commonly, the residue left over from sweeping a floor or other flat surface is removed using repeated secondary hand sweeping, moist paper towels, or wet paper napkins, or is just redispersed on the previously clean surface.

SUMMARY OF THE INVENTION

The present invention is directed to methods and compositions for the removal of dust and dirt debris, such as that debris and residue left over from dusting, brooming, or brushing a surface.

In a preferred embodiment the invention is drawn to a composition comprising a high molecular weight silicone fluid or gum. Preferably, the composition has a minimum viscosity of about 100,000 centistokes. Very preferably, the composition has a maximum viscosity of about 10,000,000 centistokes. Thus, in preferred embodiments the composition may have a viscosity in the range from about 100,000 centistokes, or about 150 centistokes, or from about 200,000 centistokes, or from about 400,000 centistokes to about 10,000,000 centistokes, or to about 5,000,000 centistokes, or to about 3,000,000 centistokes, or to about 2,500,000 centistokes, or to about 2,000,000 centistokes, or to about 1,500,000 centistokes, or to about 1,000,000 centistokes. It will be understood that these ranges include each and every viscosity (expressed in integers of centistokes) within the range, and thus each range expressly discloses every range, also expressed in integers of centistokes, contained within it.

By a silicone fluid is meant any polymerized siloxane having organic side chains. A siloxane has a repeating . . . $Si(R_1, R_2)$—O—$Si(R_3, R_4)$—O . . . backbone, with optional side groups (e.g., $R_1$-$R_4$) bonded to the tetravalent silicone atoms, and is analogous to an alkane. The siloxane side chains, if present, may comprise branched or unbranched structures, or a mixture of such structures. The siloxane may be wholly or partly saturated or may be unsaturated. Exemplary simple R groups may comprise methyl, vinyl, phenyl, ethyl, propyl or butyl. Furthermore, in certain embodiments the side chains themselves may comprise a siloxane side chain.

Preferably, although not invariably, the high molecular weight silicone composition may comprise one or more of the following, without limitation: a dimethacone (trimethyl siloxane-terminated polydimethylsiloxane) component; a phenyltrimethicone component; a dimethiconol (hydroxy-terminated polydimethylsiloxane) component, a cyclopentasiloxane component, a dimethicone/vinyl dimethicone cross-polymer component, such as a disiloxanevinyl cross polymer.

As indicated, in a preferred embodiment the high molecular weight silicone composition may comprise a polydimethylsiloxane (PDMS) component. PDMS is generally regarded as chemically inert, non-toxic, non-staining, and non-flammable. The basic formula for PDMS is

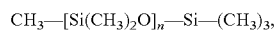

$$CH_3—[Si(CH_3)_2O]_n—Si—(CH_3)_3,$$

where the viscosity of the PDMS is determined by the value of n. When n is very low PDMS may be a thin, pourable liquid. When n is high, PDMS is a thick, rubbery, viscoelastic semi-solid. After it equilibrates semi-solid PDMS will present an external hydrophobic surface, which may advantageously adsorb hydrophobic materials. This hydrophobic surface can be disrupted by kneading the composition to expose material that was previously in the interior of the composition.

The composition of the present invention is pliable and self-leveling, and has an inherent ability to adhere to, engulf, entrap, and/or retain particulates ranging in size from less than 1 micron to larger particles having a total aggregate mass of up to about 10 times the mass of the composition itself. As used in this patent application the word "adhere", "adherent" and variations thereof means to attract (for example, statically or through hydrophobic/hydrophilic interactions), to embed, engulf, entrap and/or otherwise retain).

The high molecular weight silicone composition of the present invention is preferably semisolid and kneadable, so that when the exterior surface of the composition contains adhered or embedded dirt, dust and other residue, it can be kneaded with a minimum of physical effort to expose an interior portion of the "dough", thus regenerating the ability of the composition to attract, pick up, entrap and remove residual material from the surface. By "kneadable" is meant that the consistency of the composition is similar to that of bread dough, and that the outer surfaces of the composition can be buried within the interior of the composition (and vice versa) without substantial alteration of the intrinsic physical or chemical properties of the composition.

The high molecular weight silicone composition of the present invention is non-toxic and non-irritating, non-staining to hard surfaces, environmentally safe, and will not dry out. Preferably, the composition does not contain compounds that are volatile at room temperature. Very preferably the composition does not contain volatile organic compounds (VOCs). In the present application the term "organic" compounds include silicones.

Preferably, the high molecular weight silicone composition of the present invention is initially shaped to optimize the removal of dusting and sweeping residue. For example, the composition may be shaped into an elongated roll or bar that is substantially the length of the bristle portion of a broomhead making contact with the floor or other surface.

In one method of use, a user lightly presses or "dabs" the high molecular weight silicone composition on the residual sweepings or other particulate debris, often in a wiping motion. The residue is attracted to, adheres to and/or is embedded within the composition "dough"; preferably, hydrophobic elements of the residue are attracted to the hydrophobic portions of the exterior of the composition and are removed from the floor or other surface with the wiping movement. Because the composition is semi-solid and able to embed the residue, the disadvantages of using towels, sponges or wet napkins is avoided, as the residue gathered by the composition will become embedded within the composition and will not fall onto the floor.

In another embodiment, the high molecular weight silicone composition of the present invention may be packaged as a stand-alone product. For example, the product may be packaged in a closed container, such as a container that provides for easy removal, replacement and closure of the composition within the container.

The composition may be packaged in a container in which the exposed portion of the composition can be advanced, similar to "screw-up" deodorant stick-type formulations. In this type of embodiment the container may be closed with a cap when the composition is not in use.

In an embodiment, the composition, which may be known as a Dirt Dough™ dust removal composition, may be packaged or sold as an attachment to, or as an article that can be attached to, the handle of a dust mop or a broomstick. Thus, following sweeping or mopping a floor or other surface, the user has convenient access to the "dust dough" composition, which can, for example, be removed from a holder or container on the mop handle or broomstick and used after sweeping or mopping to remove the residue after mopping or sweeping a surface. If the surface of the composition embeds or adheres a significant amount of residue, the composition can be repeatedly kneaded or remolded to again expose a fresh outer surface.

Thus, in certain embodiments the invention is drawn to a semi-solid composition comprising a high molecular weight silicone polymer component having a viscosity at ambient temperature of between about 100,000 centistokes and about 10,000,000 centistokes, wherein said composition will not lose its semi-solid properties under ambient temperature within a time period of about 2 years, or about 1 year or about 9 months or about 6 months, or about 3 months, or about 1 month. This composition has an inherent ability to engulf, entrap, and/or retain (i.e., to adhere to) particles ranging in size from less than about 1 micron and greater. Preferably the total mass of particles, direct and dust that can be adsorbed by the composition is about 2 times, or about 3 times, or about 5 times, or about 8 times, or about 10 times the mass of the composition itself.

Importantly, the composition's ability to adhere to the particulate debris is much greater than the composition's ability to adhere to the surface, if at all.

Thus, the invention may comprise a semi-solid, moldable composition comprising a high molecular weight silicone polymer component having a viscosity at ambient temperature of between about 100,000 centistokes and about 10,000,000 centistokes, wherein a freshly exposed portion of said composition has sufficiently adhesive properties to entrap particles of debris within said composition when contacted therewith without substantially adhering to said surface. In preferred embodiments the silicone polymer component comprises a polymerized siloxane. The polymerized siloxane may comprise one or more side or end group moiety. Therefore, in certain embodiments the polymerized siloxane component may have the general formula:

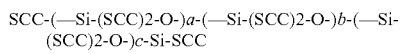

SCC-(—Si-(SCC)2-O-)$a$-(—Si-(SCC)2-O-)$b$-(—Si-(SCC)2-O-)$c$-Si-SCC wherein a, b, and c are independently 0 to about 40,000, and the average molecular weight of the polymer is between about 20,000 to about 10,000,000 and each "S.C.C." (side chain component) is independently any chemical moiety capable of being covalently attached to the Si of the polysiloxane component which does not interfere with the semi-solid, moldability, and/or kneadablity properties of the composition.

A high molecular weight silicone polymer component that may be a particularly useful component of the present invention comprises a polydimethyl siloxane component, preferably a linear polydimethyl siloxane component. However, in some embodiments the silicone polymer component may be slightly crosslinked with another chemical entity, so long as the crosslinking does not substantially affect the moldability of the composition.

In another embodiment the invention comprises a packaged product comprising a semi-solid sweeping or dusting composition comprising a high molecular weight silicone polymer component having a viscosity at ambient temperature of between about 100,000 centistokes and about 10,000,000 centistokes, wherein the composition is formed into a shape, for example, a "bar" shape such that the user may immediately apply the composition to residual dust and/or dirt left over after dusting or sweeping a floor or other flat surface.

In a particularly preferred aspect of this embodiment the package may comprise a mechanism to advance the dust dough composition, thereby exposing a fresh, unused portion as desired. For example, the mechanism may comprise a propel and/or repel type mechanism such as that found in "push-up", "twist-up" or "screw-up" mechanism such as is used in conjunction with certain shaving stick, deodorant and other products. The twist-up package, in which, for example, the base of the container acts as a screw head to advance a pedestal upon which the product is supported. The pedestal is housed within an immovable outer shell. Thus, the advancable pedestal permits the product to be exposed or raised as it is used so as to expose new surfaces of the product, thus permitting the product to be used without complete removal from the package.

In yet another embodiment the invention comprises a dry mop, sweeper, broom or other sweeping or dusting device having a component, for example, a handle or broomstick, to which is attached a semi-solid sweeping or dusting composition comprising a high molecular weight silicone polymer component having a viscosity at ambient temperature of between about 100,000 centistokes and about 10,000,000 centistokes. In one variant of this embodiment the composition may be contained in a holder or "holster" attached to the sweeping or dusting device for convenient access by the user during sweeping. In another variant of this embodiment, the composition may be comprised as a bar alongside the broom head or a similar structure located near the bottom of the broom, so that the sweeping or dusting device may be, for example, turned over to apply the composition directly to the residual dirt and dust. Such variants have the advantage of not necessitating that the user stoops down to apply the composition to the floor or other surface.

In another embodiment, the present invention is drawn to methods of removing debris particles from a surface, preferably a flat surface, comprising the steps:
a) contacting a semi-solid, kneadable dust removal composition with debris particles on said surface, the composition comprising a high molecular weight silicone polymer component having a viscosity at ambient temperature of between about 100,000 centistokes and about 10,000,000 centistokes,
b) applying said composition against said surface, thereby adhering the debris particles to the composition, and
c) removing the composition from the surface, wherein adhered debris particles are removed from the surface.

In yet another embodiment the invention is drawn to a semi-solid, moldable composition comprising a high molecular weight silicone polymer component having a viscosity at ambient temperature of between about 100,000 centistokes and about 10,000,000 centistokes, wherein a freshly exposed portion of said composition has sufficiently adhesive properties to entrap particles of debris within said composition when contacted therewith without substantially adhering to said surface. In a preferred embodiment, the silicone polymer component may comprise a polymerized siloxane; for example without limitation, a polymerized siloxane comprising one or more side or end group moiety.

In one preferred embodiment the polysiloxane component may have the general formula:

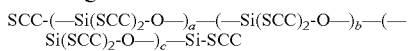

wherein a, b, and c are independent from each other (for example, independently 0 to about 40,000), and the average molecular weight of the polymer is between about 20,000 to about 10,000,000 and each "SCC" (side chain component) is independently any chemical moiety which may be covalently attached to the Si of the polysiloxane component. Preferably, though not necessarily invariably, the side chain component is not a polymer having a molecular weight of greater than 1000 Da or a cross-linking reagent.

It will be understood that the ranges listed in this patent application explicitly disclose, and are intended to disclose and incorporate by reference herein, the set of each and every range contained within the stated range, as the numerical value of the end points of such ranges vary by natural numbers (0, 1, 2, 3, etc.)

The Examples that follow provide additional disclosure of certain embodiments of the present invention, and do not limit the scope of the invention, which is defined solely by the claims that conclude this specification.

DETAILED DESCRIPTION OF THE INVENTION

Example 1

A preparation of polydimethylsiloxane (PDMS) having a viscosity of about 500,000 centistokes is formed into a cigar-shaped, elongated bar approximately 6 inches long and 1.5 to 2 inches thick. The PDMS used to make the bar is linear, is not cross-linked, and has a shiny, malleable surface. The PDMS bar is packaged in a clear, removable cellophane tube within a sealable plastic tube; the plastic tube comprises an elastic band or hook-and-loop fastener (VELCRO®) band permitting the package to be fastened to the handle of a dust broom.

Example 2

A semi-solid preparation is made of divinyl terminated poly(dimethylsiloxane-co-diphenylsiloxane), having a viscosity of about 700,000 cps and a general formula:

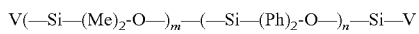

wherein m and n are independently 1 to about 50,000, and the average molecular weight of the polymer is between about 20,000 to about 10,000,000, and wherein V is a vinyl group, Me is a methyl group, and Ph is a phenyl group. The composition is formed into a bar having a length of about 6 inches, a width of about 2-3 inches, and a depth of about 1.5-2 inches and packaged in a capped twist-up dispenser permitting the top portion of the composition to be extruded as desired to expose new composition surface.

Example 3

A preparation is made using poly(methylhydrosiloxane), trimethylsilyl terminated, having a viscosity of about 1,000,000 cps and a general formula:

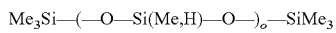

wherein o is about 50,000-70,000, and the average molecular weight of the polymer is between about 20,000 to about 10,000,000, and wherein Me is a methyl group. The composition is formed into a malleable and kneadable ball or pellet having a width or diameter of about 3 inches. The composition is packaged in a substantially airtight container for use.

Example 4

The dust removal composition of Example 1 is removed from the cellophane tube, and returned to the plastic tube, and the plastic tube is fastened to the handle of a dust mop for use. The dry dust mop is used to sweep a floor, and the residue remaining on the floor is collected, using the mop, into a pile. The dust removal composition is removed from the plastic tube and is pressed against the pile of dust residue with sufficient force to cause the dust to adhere or become embedded within the dust removal composition.

The composition is then kneaded to cause adhered or embedded dust to be buried within the composition and expose unused portions of the composition and reinserted into the plastic tube fastened to the mop handle for future use.

Example 5

The capped twist-up dispenser dust removal composition of Example 2, is placed into a small canvas bag which is attached, using a VELCRO® hook and loop fastener, to the handle of a broom. The broom is used to sweep debris on a floor, and the sweeping residue is gathered and initially removed using a dustpan.

The cap is removed from the twist-up package containing the dust removal composition and the bottom of the package twisted to extrude the top portion of the composition in preparation for use. The composition within the package is then applied to the dust and residue remaining on the floor following use of the dustpan with sufficient force to cause the dust to adhere or become embedded within the dust removal composition. The cap is then placed on the twist-up package and the package returned to the canvas bag for the next use.

Following repeated use, the top portion of the dust removal composition is substantially embedded with dust and dirt. A knife is drawn across the top opening of the package to remove the top portion of the dust composition, this top portion is disposed of, and the package is twisted to advance and expose a new, fresh portion of the dust removal composition for the next use.

Example 6

The dust removal composition of Example 3 is stored in its airtight container within a kitchen drawer for use. Following repeated use of an espresso coffee grinder on a butcher block kitchen counter, the counter is coated with fine coffee grounds, some of which fall somewhat within the grains of the wood of the butcher block. A small hand brush is used to brush the majority of the grounds from the surface of the counter; however fine coffee grounds remain on the surface of the counter.

The dust removal composition is taken from its container and lightly pressed on the counter surface using a "dabbing" or "patting" motion. The fine coffee grounds are embedded within the dust removal composition and removed from the countertop. Following use the dust removal composition is kneaded to bury the majority of the coffee grounds within the ball and to expose an unused portion of the interior of the ball for subsequent uses. The ball of dust removal composition is then returned to its airtight container and returned to the drawer for the next use.

It will be understood that the present invention has been described in this specification with reference to specific features, embodiments and examples, but that the scope of the invention is defined solely by the claims that conclude this specification. Any feature or features described with respect to one or more particular embodiment of the invention may be combined in any operable combination, and similarly, any feature may be omitted or substituted with another suitable feature without departing from the scope of the invention unless specifically stated.

Any and all patents, patent publications, or printed publications (including internet publications) cited herein are each hereby individually incorporated by reference herein in their entirety.

What is claimed is:

1. A method of removing debris particles from a surface, comprising the steps:
   a) contacting a semi-solid, kneadable dust removal composition with debris particles on said surface, the composition comprising a high molecular weight silicone polymer component having a viscosity at ambient temperature of between about 100,000 centistokes and about 10,000,000 centistokes,
   b) applying said composition against said surface, thereby adhering the debris particles to the composition, and
   c) removing the composition from the surface, wherein adhered debris particles are removed from the surface.

2. The method of claim 1, wherein a freshly exposed portion of said composition has a sufficiently adherent property to entrap particles of debris within said composition when contacted therewith without substantially adhering to said surface.

3. The method of claim 2, wherein said surface comprises a floor.

4. The method of claim 3 wherein step a) is performed following a step selected from the group consisting of mopping, brushing or sweeping said surface.

5. The method of claim 4 wherein step a) is performed following an initial step of selected from the group consisting of mopping, brushing or sweeping debris from said surface into a dustpan.

6. The method of claim 4 wherein the semisolid composition is directly or indirectly joined to a broom or duster in a manner wherein said composition contacts an area of said surface after a broom or duster has contacted the same area of the surface.

7. The method of claim 6 wherein the semi-solid, kneadable dust removal composition is formed into a "bar" shape for packaging.

8. The method of claim 1 wherein said semisolid composition is directly or indirectly joined to a broom or duster handle.

9. The method of claim 1 wherein a freshly exposed portion of said composition has a sufficiently adherent property to entrap particles of debris within said composition when contacted therewith them without substantially adhering to said surface.

10. The method of claim 9 wherein the semi-solid kneadable dust removal composition is formed into an elongated shape for packaging.

11. The method of claim 1 wherein said silicone polymer component comprises a polymerized siloxane.

12. The method of claim 11 wherein said polymerized siloxane comprises one or more side or end group moiety.

13. The method of claim 11 wherein the polysiloxane component has the general formula:

SCC-(—Si-(SCC)$_2$-O—)$_a$—(—Si-(SCC)$_2$-O—)$_b$—(—Si-(SCC)$_2$-O—)$_c$—Si-SCC wherein a, b, and c are independent from each other, and the average molecular weight of the polymer is between about 20,000 to about 10,000,000 and each "SCC" (side chain component) is independently any chemical moiety which may be covalently attached to the Si of the polysiloxane component, provided that said composition is not substantially cross-linked.

14. The method of claim 13 wherein said high molecular weight silicone polymer component comprises a cross-linked or linear polydimethyl siloxane component.

15. The method of claim 13, in which the polysiloxane component has a general formula:

V(—Si—[(Me)$_2$-O—]$_m$—(—Si—(Ph)$_2$-O—)$_n$]$_o$—Si—V wherein V is a vinyl group, Me is a methyl group, and Ph is a phenyl group, and m, n and o are each independent values.

16. The method of claim 13, in which the polysiloxane component has a general formula:

Me$_3$Si—(O—Si(Me,H)—O—)$_o$—SiMe$_3$.

17. The method of claim 1 wherein the semi-solid, kneadable dust removal composition is packaged into a "screw-up" type stick dispenser.

18. The method of claim 1 wherein the semi-solid, kneadable dust removal composition is formed into a compact shape for packaging.

* * * * *